(12) United States Patent
Kobayashi et al.

(10) Patent No.: US 6,538,792 B1
(45) Date of Patent: *Mar. 25, 2003

(54) ELECTROCHROMIC DEVICE

(75) Inventors: Masaaki Kobayashi, Yokohama (JP); Izuru Sugiura, Yokohama (JP); Yoshinori Nishikitani, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/596,324

(22) Filed: Jun. 19, 2000

Related U.S. Application Data

(63) Continuation of application No. PCT/JP98/05739, filed on Dec. 18, 1998.

(30) Foreign Application Priority Data

Dec. 19, 1997 (JP) ............................................. 9-364872

(51) Int. Cl.$^7$ .................................................. G02F 1/15
(52) U.S. Cl. ........................ 359/265; 359/270; 359/272; 359/273; 428/411.1; 428/500; 428/515; 428/689; 428/702; 428/704; 252/582; 252/586
(58) Field of Search ................................ 359/265, 270, 359/273, 272; 428/411.1, 500, 515, 702, 704, 689; 252/582, 586

(56) References Cited

U.S. PATENT DOCUMENTS

| 5,910,854 | A | * | 6/1999 | Varaprasad et al. | ......... | 359/273 |
| 6,203,154 | B1 | * | 3/2001 | Kobayashi et al. | ......... | 359/265 |
| 6,285,486 | B1 | * | 9/2001 | Kobayashi et al. | ......... | 359/265 |

FOREIGN PATENT DOCUMENTS

| JP | 52-100381 | 8/1977 |
| JP | 52-105179 | 9/1977 |
| JP | 52-135884 | 11/1977 |
| JP | 54-11084 | 1/1979 |
| JP | 57-57779 | 4/1982 |
| JP | 61-107323 | 5/1985 |
| JP | 1-230691 | 9/1989 |
| JP | 4-58228 | 2/1992 |
| JP | 8-244527 | 9/1996 |
| JP | 9-120088 | 5/1997 |

* cited by examiner

Primary Examiner—Deborah Jones
Assistant Examiner—Ling Xu
(74) Attorney, Agent, or Firm—Akin, Gump, Strauss, Hauer & Feld, L.L.P.

(57) ABSTRACT

An electrochromic element composed of an ionically conductive substance layer containing a specified electrochromic substance sandwiched between two electrically conductive substrates at least one of which is transparent.

6 Claims, 1 Drawing Sheet

ELECTROCHROMIC DEVICE

CROSS-REFERENCE TO RELATED APPLICATION

This application is a continuation of International Application No. PCT/JP98/05739 filed Dec. 18, 1998, the disclosure of which is incorporated herein by reference.

BACKGROUND OF THE INVENTION

This invention relates to electrochromic devices and more particularly electrochromic devices which are useful as light controllable windows for buildings, automobiles and passenger vehicles and various types of light controllable glasses to be used for indoor decoration or partitions; display devices; and antiglare mirrors for automobiles and other vehicles.

DESCRIPTION OF THE PRIOR ART

A conventional electrochromic device such as a light controllable glass of conventional type as disclosed in Japanese Patent Laid-Open Publication No. 63-18336 is known which glass comprises a chromogenic material in the form of a film obtained by sputtering or vacuum-depositing an inorganic oxide such as tungsten oxide ($WO_3$) over a transparent electrically conductive film.

However, the conventional film formation techniques must be carried out under vacuum, resulting in increased production costs and a requirement of a large size vacuum apparatus if an electrochromic device of a large area is intended to be produced. Furthermore, since a substrate is heated at an elevated temperature during sputtering, it is necessary to select certain conditions if a substrate other than a glass, such as a synthetic resin made substrate is used, resulting in difficulties in reducing the weight of an electrochromic device.

There is also a problem that tungsten oxide can only make an electrochromic device exhibit blue color.

SUMMARY OF THE INVENTION

An object of the present invention is to provide an electrochromic device which can be manufactured using an inexpensive color developing material with easy operations and can easily be changed in color tone.

DETAILED DESCRIPTION OF THE INVENTION

An electrochromic device proposed by the present invention solves the above-mentioned problems of the prior art by forming an ion conductive material layer containing a specified electrochromic material.

Namely, according to the present invention, there is provided an electrochromic device comprising two conductive substrates, at least one of which is transparent, and an ion conductive substance layer disposed therebetween and containing an electrochromic substance represented by the formula

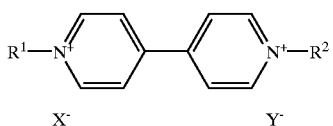

(1)

wherein $X^-$ and $Y^-$ may be the same or different and are each a counter anion selected from the group consisting of a halogen anion, $ClO_4^-$, $BF_4^-$, $PF_4^-$, $CH_3COO^-$ and $CH_3(C_6H_4)SO_3^-$ and $R^1$ and $R^2$ may be the same or different and are each a hydrocarbon group having from 1 to 20 carbon atoms.

In the present invention, two electrically conductive substrates, at least one of which is transparent, are used. The term "electrically conductive substrate" designates substrates which have a function as an electrode. Therefore, the conductive substrates used in the invention encompass those entirely formed from an electrically conductive material or formed with a non-electrically conductive substrate and an electrode layer disposed thereon. Regardless of whether a substrate is electrically conductive or not, it necessarily has a smooth surface at normal temperature but may have a flat or curved surface and may be deformable under stress.

At least of one of the two electrically conductive substrates is a transparent electrically conductive substrate and the other may be a transparent or opaque or reflective electrically conductive substrate.

Two conductive substrates both of which are transparent are suitable for a display device and a light controllable glass. A combination of a transparent conductive substrate and an opaque conductive substrate is suitable for a display device, while a combination of a transparent conductive substrate and a reflective substrate is suitable for an electrochromic mirror.

The transparent conductive substrate is generally formed by laminating a transparent electrode layer over a transparent substrate. The term "transparency" used herein designates an optical transmission ranging from 10 to 100 percent.

The opaque conductive substrate is may be a laminate obtained by laminating an electrode layer over one surface of a metal plate or a non-conductive opaque substrate such as various opaque plastics, ceramics, glasses, woods and stones.

The reflective electrically conductive substrate may be exemplified by (1) a laminate comprising a non-conductive transparent or opaque substrate and a reflective electrode layer formed thereon, (2) a laminate comprising a no-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon and (5) a plate-like substrate which itself functions as a reflective layer and an electrode.

No particular limitations is imposed on the transparent substrate which may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate and polystyrene.

The substrates used in the present invention must have a smooth surface at normal temperature.

There is no particular restriction to the transparent electrode layer as long as it meets the requirements for achieving the purpose of the present invention. Specific examples of the electrode layer include electrically conductive film such as thin films of metals such as gold, silver, chrome, copper and tungsten or metal oxides such as ITO ($In_2O_3$—$SnO_2$), tin oxide, silver oxide, zinc oxide and vanadium oxide.

The electrode has a film thickness in the range of usually 100 to 5,000 and preferably 500 to 3,000 angstrom. The surface resistance of the electrode is usually in the range of 0.5–500 and preferably 1–50 Ω/sq.

No particular limitation is imposed on a method of forming the electrode layer. Any suitable conventional methods may be employed, depending upon the metal and metal oxide constituting the electrode. In general, the formation of the electrode layer is carried out by vacuum evaporation, ion plating, sputtering and a sol-gel method. The thickness of the electrode layer is selected within the range such that the transparency thereof is not affected. The electrode layer may be partially provided with an opaque electrode-activator for the purpose of imparting oxidation-reduction capability, electric conductivity and electric double layer capacitance, the electrode-activator being provided in an amount such that the transparency of the entire electrode layer is not harmed. Electrode activators eligible for the purpose of the invention are a metal such as copper, silver, gold, platinum, iron, tungsten, titanium and lithium, an organic material having oxidation-reduction capability such as polyaniline, polythiophen, polypyrrole and phthalocyanine, a carbon material such as active carbon and graphite and a metal oxide such as $V_2O_5$, $MnO_2$, NiO and $Ir_2O_3$ and mixtures thereof. A variety of resins may be used for integrating the electrode activator in the electrode. The opaque electrode activator may applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of a mesh.

No particular limitation is imposed on the reflective electrode layer as long as it is stable electrochemically and has a specular surface. Eligible for the reflective electrode layer includes the films of metal such as gold, platinum, tungsten., tantalum, rhenium, osmium, iridium, silver, nickel and palladium and the film of an alloy such as platinum-palladium, platinum-rhodium and stainless steel. The reflective electrode layer is necessarily disposed onto a substrate or a transparent substrate with the reflectiveness and specularity of the layer maintained. The reflective electrode layer is formed onto a substrate by any suitable conventional method such as vacuum deposition, ion-plating and sputtering.

No particular limitation is imposed on a substrate on which the reflective electrode layer is disposed. The substrate may be transparent or opaque. Specific examples of the substrate include those as exemplified with respect to the transparent substrate described above, a variety of plastics, resins, glasses, woods and stones.

No particular limitation is imposed on materials for the above-mentioned reflective plate or layer as long as it can provide a specular surface. For example, silver, chrome, aluminum and stainless steel are eligible.

The plate-like substrate having a reflective layer and functioning as an electrode may be exemplified by the substrates exemplified with respect to the reflective electrode among which are self-supportive.

The ion conductive material layer to be disposed between the two conductive substrates is now described.

The ion conductive substance layer used in the present invention is composed of an ion conductive substance containing a specified electrochromic substance.

In the present invention, the term "ion conductive substance" designates a substance having an ion conductivity of $1 \times 10^{-7}$ S/cm or more at room temperature and playing a role of coloring, decoloring or discoloring an electrochromic substance. No particular limitation is imposed on the ion conductive material, which may thus be liquid, gel or solid. Solid ion conductive substances are particularly preferred for the purpose of the a invention because an electrochromic device which is overall solid and excelled in various performances for various practical usage can be obtained.

Liquid Ion Conductive Material

Eligible liquid ion conductive materials are those dissolving a supporting electrolyte such as salts, acids and alkalis in a solvent.

Although any suitable solvents may be used as long as they can dissolve a supporting electrolyte, preferred are those having polarity. Specific example of such solvents are water and an organic polar solvent such as methanol, ethanol, propylene carbonate, ethylene carbonate, dimethylsulfoxide, dimethoxyethane, acetonitrile, γ-butyrolactone, γ-valerolactone, sulforan, dimethylformamide, dimethoxyethane, tetrahydrofuran, propionnitrile, glutaronitlile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, tetrahydrofuran, adiponitrile, methoxyacetonitrile, dimethylacetoamide., methylpyrrolidinone, dimethylsulfoxide, trimethylphosphate and polyethylene glycol. These may be used singlely or in combination.

Although not restricted, salts used as a supporting electrolyte may be alkali metal salts, inorganic ion salts such as alkaline earth metal salts, quaternary ammonium salts and cyclic quaternary ammonium salts. Specific examples of such salts include alkali metal salts of lithium, sodium or potassium such as $LiClO_4$, LiSCN, $LiBF_4$. $LiAsF_6$, $LiCF_3SO_3$, $LiPF_6$, LiI, NaI, NaSCN, $NaClO_4$, $NaBF_4$, $NaAsF_6$, KSCN and KCl, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$ and mixtures thereof Acids used as a supporting electrolyte may be exemplified by inorganic acids and organic acids, specific examples of which include sulfuric acid, hydrochloric acid, phosphoric acid, sulfonic acid carboxylic acid.

Alkalis used as a supporting electrolyte include sodium hydroxide, potassium hydroxide and lithium hydroxide.

Gelatinized-liquid Ion Conductive Material

The gelatinized-liquid ion conductive material may be those which are gelatinized or made to be viscous by adding a polymer or a gelatinizer to the above-mentioned liquid ion conductive material.

No particular limitation is imposed on the polymers, which thus may be polyacrylonitrile, carboxymethylcellulose, polyvinyl chloride, polyethylene oxide, polyurethane, polyacrylate, polyamide, polyacrylamide, cellulose, polyester, polypropyleneoxide and nafion.

Preferred examples of the gelatinizers are oxyethylenemethacrylate, oxyethyleneacrylate, urethaneacrylate, acrylamide and agar-agar.

Solid Ion Conductive Material

No particular limitation is imposed on the solid ion conductive material as long as it is solid at room temperature and ion conductive. Preferred examples of such solid ion conductive materials are polyethyleneoxide, the polymer of oxyethylenemethacrylate, nafion, polystyrene sulfonate, $Li_3N$, Na-β-$Al_2O_3$ and $Sn(HPO_4)_2H_2O$. Particularly preferred are polymer solid electrolytes obtained by polymerizing a polyethyleneoxide-based compound, an oxyalkyleneacrylate-based compound or a urethaneacrylate-based compound.

First examples of such polymer solid electrolytes are those obtained by solidifying a composition (hereinafter referred to as Composition A) containing the above-described organic polar solvent and supporting electrolyte and a urethaneacrylate of the formula (2) below.

The term "cure" used with respect to the polymer solid electrolyte as well as Composition B hereinafter described designates a state where a polymerizing or crosslinking component is cured with the progress of polymerization (polycondensation) or crosslinking and thus the composition does not flow at room-temperature. The composition thus cured has the basic structure in the form of network.

Formula (3) is represented by the formula

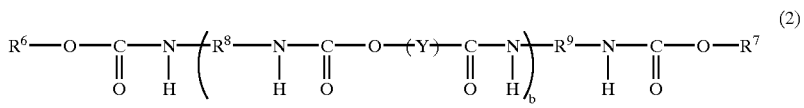
(2)

wherein $R^6$ and $R^7$ may be the same or different and are each a group of formula (3), (4) or (5) below, $R^8$ and $R^9$ may be the same or different and are each a $C_1$–$C_{20}$, preferably $C_2$–$C_{12}$ divalent hydrocarbon residue, Y is selected from a polyether unit, a polyester unit, a polycarbonate unit and the mixed unit thereof and b is an integer from 1 to 100, preferably 1 to 50 and more preferably 1 to 20.

Formulae (3), (4) and (5) are represented by the formulae

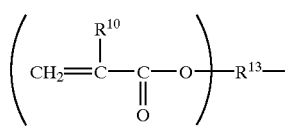
(3)

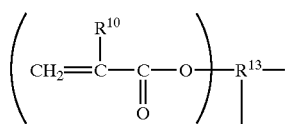
(4)

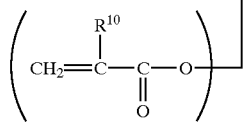

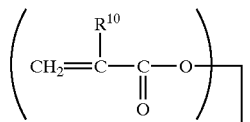
(5)

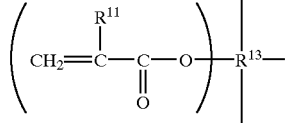

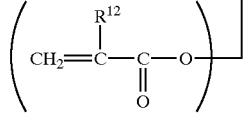

wherein $R^{10}$, $R^{11}$ and $R^{12}$ may be the same or different and are each a hydrogen atom or a $C_1$–$C_3$ alkyl group and $R^{13}$ is a $C^1$–$C_{20}$, preferably $C_2$–$C_8$ organic residue of divalent through quateivalent.

Specific examples of such organic residues are a hydrocarbon residue such as alkyltolyl, alkyltetratolyl and alkylene of the formula

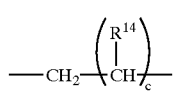
(6)

wherein $R^{14}$ is a $C_1$–$C_3$ alkyl group or hydrogen, c is an integer from 0 to 6 and if c is 2 or greater, $R^{14}$ groups may be the same or different.

The hydrocarbon residue may be a group part of which hydrogen atoms are substituted by an oxygen-containing hydrocarbon group such as a $C_1$–$C_6$, preferably $C_1$–$C_3$ alkoxy group and a $C_6$–$C_{12}$ aryloxy group.

Specific examples of $R^{13}$ group in formulae (3) thorough (5) are those represented by the following formulae:

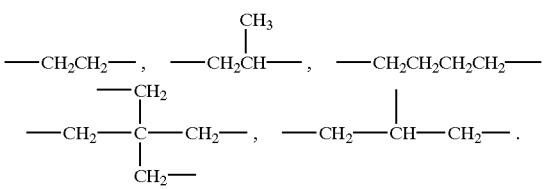

Each of the divalent hydrocarbon residues represented by $R^8$ and $R^9$ in formula (2) is exemplified by a divalent chain-like hydrocarbon group, an aromatic hydrocarbon group and an alicyclic-containing hydrocarbon group. Specific examples of the chain-like divalent hydrocarbon group are those represented by formula (6) above.

Specific examples of the aromatic hydrocarbon group and alicyclic-containing hydrocarbon group are those represented by the following formulae:

(7)

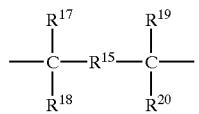
(8)

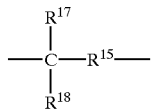
(9)

wherein $R^{15}$ and $R^{16}$ may be the same or different and each are a phenylene group, a phenylene group having an alkyl subsutituent, a cycloalkylene group and a cycloalkylene group having an alkyl substituent, $R^{17}$, $R^{13}$, $R^{19}$ and $R^{20}$ may be the same or different and each are a hydrogen atom or a $C_1$–$C_3$ alkyl group.

Specific examples of the groups $R^8$ and $R^9$ in formula (3) are those represented by the following formulae:

(10)

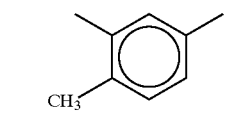
(11)

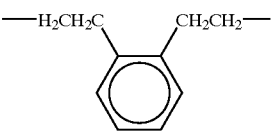
(12)

-continued

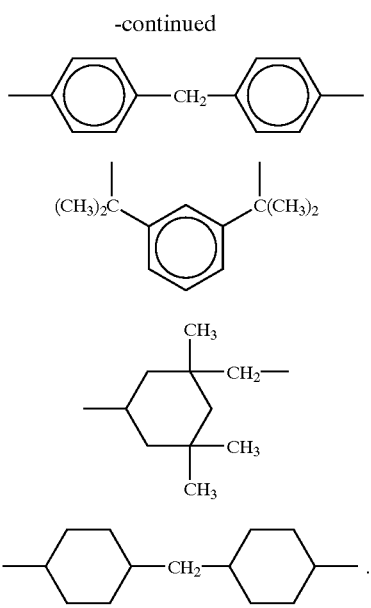

In formula (2), "Y" indicates a polyether unit, a polyester unit, a polycarbonate unit and mixed unit thereof. Each of these units is represented by the following formulae:

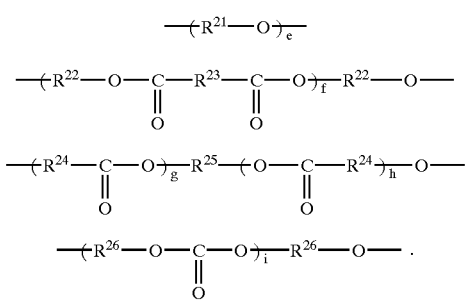

In formulae (a) through (d), $R^{21}$ through $R^{26}$ may be the same or different and are each a $C_1$–$C_{20}$, preferably $C_2$–$C_{12}$ divalent hydrocarbon residue. Preferred for $R^{24}$ are $C_2$–$C_6$ divalent hydrocarbon residues. Preferred for $R^{21}$ through $R^{26}$ are straight or branched alkylene groups among which methylene, ethylene, trimethylene, tetramethylene, pentamethylene, hexamethylene and propylene groups are preferred for $R^{23}$, and ethylene and propylene groups are preferred for $R^{21}$, $R^{22}$ and $R^{24}$ through $R^{26}$. The letter "e" in formula (a) is an integer from 2 to 300, preferably 10 to 200, the letter "f" is an integer from 1 to 300, preferably 2 to 200, the letter "g" is an integer from 1 to 200, preferably 2 to 100, the letter "h" is an integer from 1 to 200, preferably 2 to 100 and the letter "i" is an integer from 1 to 300, preferably 10 to 200.

Each unit represented by formulae (a) through (d) may be a copolymer of the same or different units. Namely, if a plurality of $R^{21}$ through $R^{26}$ are present, the groups of each $R^{21}$ thorough $R^{26}$ may be the same or different. Preferred examples of the above-mentioned polymer are polymers of ethyleneoxide and propyleneoxide.

The urethaneacrylate may be prepared by any suitable conventional method. Urethaneacrylate of formula (3) has a molecular weight in the range from 2,500 to 30,000, preferably 3,000 to 20,000. The urethaneacrylate has preferably 2–6, more preferably 2–4 polymerization functional groups per molecule.

An organic polar solvent (organic nonaqueous solvent) is added in an amount of 100–200, preferably 200–900 weight parts per 100 parts of the urethaneacrylate. The addition of the organic polar solvent in a too less amount would result in insufficient ion conductivity, while the addition of the organic polar solvent in a too much amount would cause reduced mechanical strength. The supporting electrolyte may be salts, acids or alkalis. The supporting electrolyte should be added in an amount of 0.1 to 30, preferably 1 to 20 weight percent of the organic polar solvent.

Composition (A) is obtained by solidifying the above-described essential components, namely, urethaneacrylate, organic nonaqueous solvent and supporting electrolyte. If necessary, any suitable optional components may be added to Composition (A) as long as they are not obstructive to the achievement of the purpose of the invention. Such components may be crosslinkers and photo- or thermal polymerization initiators.

Second examples of the polymeric solid electrolyte are polymeric solid electrolytes obtained by solidifying a composition (hereinafter referred to as Composition (B)) comprising an organic polar solvent, a supporting electrolyte, a monofunctional acryloyle-modified polyalkylene oxide of formula (17) below or a polyfunctional acryloyle-modified polyalkylene oxide of formula (18) or (19) below.

Formula (17) is represented by the formula

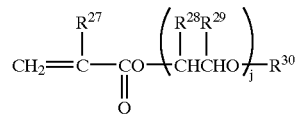

wherein $R^{27}$, $R^{28}$, $R^{29}$ and $R^{30}$ may be the same or different and are each hydrogen and an alkyl group having from 1 to 5 carbon atoms and j is an integer of 1 or greater Specific examples of the alkyl group include methyl, ethyl, i-propyl, n-propyl, n-butyl, t-butyl and n-pentyl. Preferred for $R^{22}$, $R^{23}$ and $R^{34}$ are hydrogen and a methyl group. Preferred for $R^{30}$ are hydrogen and methyl and ethyl groups.

The letter "j" in formula (17) is an integer of 1 or greater, usually from 1 to 100, preferably from 2 to 50 and more preferably from 2 to 30.

Specific examples of compounds represented by formula (17) are those having 1–100, preferably 2–50 and more preferably 1–20 oxyalkylene units, such as methoxypolyethylene glycol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If "j" is 2 or greater, the compound may be those having different oxyalkylene units, that is, copolymerized oxyalkylene units which for instance have 1–50, preferably 1–20 oxyethylene units and 1–50, preferably 1–20 oxypropylene units. Specific examples of such compounds are (ethylene.propylene) glycol methacrylate, ethoxypoly (ethylene.propylene) glycol methacrylate, methoxypoly (ethylene.propylene) glycol methacrylate, methoxypoly (ethylene.propylene) glycol acrylate, ethoxypoly methoxypoly (ethylene.propylene) glycol acrylate and mixtures thereof.

The polyfunctional acryloyl-modified polyalkylene oxide may be a bifunctional acryloyl-modified polyalkylene oxide represented by the formula

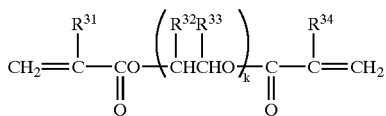

(18)

wherein $R^{31}$, $R^{32}$, $R^{33}$ and $R^{34}$ are each hydrogen and a $C_1$–$C_5$ alkyl group and k is an integer of 1 or greater; or a polyfunctional acryloyl-modified polyalkylene oxide having more than three functional groups represented by the formula

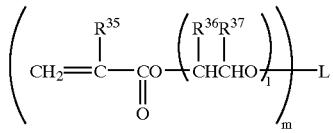

(19)

wherein $R^{35}$, $R^{36}$ and $R_{37}$ are each hydrogen and a $C_1$–$C_5$) alkyl group, l is an integer of 1 or greater, m is an integer from 2 to 4 and L is a connecting group of valence indicated by m.

In formula (18), $R^{31}$, $R^{32}$, $R^{33}$ and $R^{34}$ are each hydrogen or a $C_1$–$C_5$ alkyl group, such as methyl, ethyl, i-propyl, n-propyl, n-butyl, t-butyl, t-butyl and n-pentyl among which preferred are hydrogen and particularly preferred is methyl.

The letter "k" in formula (18) is an integer of 1 or greater, usually from 1 to 100, preferably from 2 to 50, more preferably from 2 to 30. Preferred examples of compounds of formula (19) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If k is 2 or greater, the compounds of formula (18) may be those having different oxyalkylene units, that is, polymerized oxyalkylene unit having 1–50, preferably 1–20 oxyethylene units and 1–50, preferably 1–20 oxypropylene units, such as poly(ethylene.propylene)glycol dimethacrylate, poly(ethylene.propylene)glycol diacrylate and mixtures thereof.

In formula (19), $R^{35}$, $R^{36}$ and $R^{37}$ are each hydrogen or a $C_1$–$C_5$ alkyl group, such as methyl, ethyl, i-propyl, n-propyl, n-butyl, t-butyl and n-pentyl. Particularly preferred for $R^{35}$, $R^{36}$ and $R^{37}$ are hydrogen and a methyl group.

The letter "l" is an integer of 1 or greater, usually from 1 to 100, preferably from 2 to 50 and more preferably from 2 to 30.

The letter "m" indicates the number of connecting group "L" and is an integer from 2 to 4.

Connecting group "L" is a divalent, trivalent or quatravalent hydrocarbon group having 1–30, preferably 1–20 carbon atoms.

Such divalent hydrocarbon groups may be alkylene, arylene, arylalkylene, alkylarylene and hydrocarbon groups having those groups as the base skeleton. Specific examples of such hydrocarbon groups are those represented by the following formulae

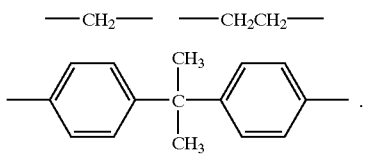

Such trivalent hydrocarbon groups may be alkyltryl, aryltryl, arylalkyltryl, alkylaryltryl and hydrocarbon groups having those groups as the base skeleton. Specific examples of such hydrocarbon groups are those represented by the following formulae:

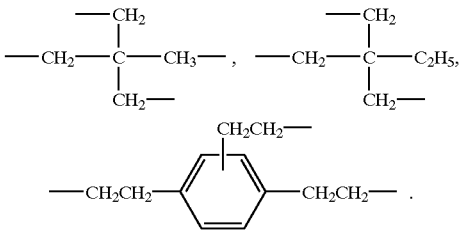

Such quatravalent hydrocarbon groups may be alkyltetraryl, aryltetraryl, arylalkyltetraryl, alkylaryltetraryl and hydrocarbon groups having those groups as the base skeleton. Specific examples of such hydrocarbon groups are those represented by the following formulae:

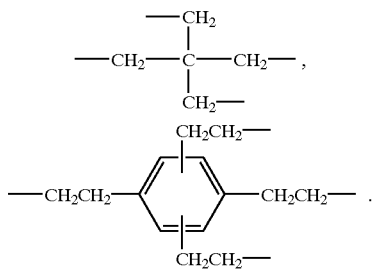

Specific examples of compounds of formula (20) are those having 1–100, preferably 2–50, more preferably 1–20 of an oxyalkylene units such as trimethylolpropanetri (polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra(polyethylene glycol methaacrylate) tetramethylolmethanetetra(polypropylene glycol acrylate), tetramethylolmethanetetra(polypropylene glycol methaacrylate), 2,2-bis[4-(acryloxypolyethoxy) phenyl]propane, 2,2-bis[4-(methaacryloxypolyethoxy) phenyl]propane, 2,2-bis[4-(acryloxypolyisopropoxy) phenyl]propane, 2,2-bis[4-(methaacryloxypolyisopropoxy) phenyl]propane and mixtures thereof.

If l is 2 or greater, compounds of formula (20) may be those having different oxyalkylene units, that is, polymerized oxyalkylene units having 1–50, preferably 1–20 of oxyethylene units and 1–50, preferably 1–20 oxypropylene units. Specific examples of such compounds include trimethyloipropaneti(poly(ethylene.propylene)glycol acrylate), trimethylolpropanetri(poly(ethylene.propylene) glycol methaacrylate), tetramethylolmethanetetra(poly (ethylene.propylene)glycol acrylate), tetramethylolmethanetetra(poly(ethylene.propylene)glycol acrylate) and mixtures thereof.

There may be used the difunctional acryloyl-modified polyalkyleneoxide of formula (18) and the polyfunctional acryloyl-modified polyalkyleneoxide of formula (19) in combination. When these compounds are used in combination, the weight ratio of the compound of formula (18) to that of formula (19) is in the range from 0.01/99.9 to 99.9/0.01, preferably from 1/99 to 99/1 and more preferably from 20/80 to 80/20.

The above-described organic polar solvent should be added in an amount of 50–800, preferably 100–500 weight percent based on the weight of the polyfunctional acryloyl-modified polyalkyleneoxide. The above-described supporting electrolyte should be added in an amount of 1–30, preferably 3–20 weight percent based on the total weight of the polyfunctional acryloyl-modified polyalkyleneoxide and the organic polar solvent.

Similarly to Composition (A), if necessary, cross-linkers or polymerization initiators may be added to Composition (B). Such components should be added in an amount of 0.005–5, preferably 0.01–3 weight percent based on the total weight of the polyfunctional acryloyl-modified polyalkylene oxide.

In the present invention, regardless of whether the ion conductive substance is liquid, gelatinized liquid or solid, an ion conductive substance layer is formed using a dispersion obtained by dispersing a specified electrochromic substance into the ion conductive substance.

An electrochromic substance which is a requisite component in the present invention and is dispersed into the ion conductive substance, typically the above-described Compositions (A) or (B), is a compound represented by the formula

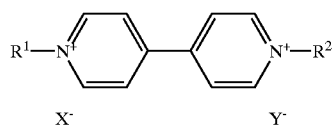

(1)

wherein X⁻ and Y⁻ are each a counter anion and may be the same or different and an anion selected from the group consisting of a halogen anion, $ClO_4^-$, $BF_4^-$, $PF_4^-$, $CH_3COO^-$ and $CH_3(C_5H_4)SO_3^-$ and R1 and R2 may be the same or different and are each a hydrocarbon group having from 1 to 20 carbon atoms.

The halogen anion may be F⁻, Cl⁻, Br⁻ and I⁻. In formula (1), $R^1$ and $R^2$ are each independently a hydrocarbon group having from 1 to 20, preferably 1 to 12 carbon atoms and may be the same or different. Specific examples of the hydrocarbon group are an alkyl group, an aralkyl group or an aryl group, and preferably an alkyl group and aralkyl group. Specific examples of such an alkyl group are methyl, ethyl, n-propyl, i-propyl, n-butyl, i-butyl and n-hexyl groups. Specific examples of such an aralkyl group are benzyl,phenetyl, phenylpropyl, trimethyl and ethylphenylmethyl groups.

Specific examples of a compound having a viologen structure of formula (1) are N,N'-diheptylbipyiidiniumdibromide,
N,N'-diheptylbipyridiniumdichloride,
N,N'-diheptylbipyridiniumdiperchlorate,
N,N'- diheptylbipyridiniumtetraphloroborate,
N,N'-diheptylbipyridiniumhexaphlorophosphate,
N,N'-dihexylbipyridiniumdibromide, N,N'-dihexylbipyridiniumdichloride,
N,N'-dihexylbipyridiniumdiperchlorate,
N,N'- dihexylbipyridiniumtetraphloroborate,
N,N'- dihexylbipyridiniumdihexaphlorophosph ate,
N,N'-dipropylbipyridiniumdibromide, N,N'-dipropylbipyridiniumdichloride,
N,N'-dipropylbipylidiniumdiperchlorate,
N,N'- dipropylbipyridiniumtetraphloroborate,
N,N'-dipropylbipyrndiniumdihexaphlorophosphate,
N,N'-dibenzylbipynidiniumdibromide,
N,N'-dibenzylbipyridiniumperchlorate,
N,N'-dibenzylbipyridiniumtetraphloroborate,
N,N'- dibenzylbipyiidiniumdihexaphlorophosphate,
N-heptyl-N'-benzylbipryridiniumdiperchlorate,
N-heptyl-N'-benzylbipryridiniumditetraphloroborate,
N-heptyl-N'-benzylbipryridinumdibromide,
N-heptyl-N'-benzylbipryidiniumdichloride,
N-heptyl-N'-methylpyridiniumdibromide and N-heptyl-N'-methylpyridiniumdichloride.

Although the concentration of an electrochromic substance of formula (1) in an ion conductive substance layer is arbitrarily selected. However, it is within the range of from 0.00001 to 50 percent by weight, preferably 0.0001 to 30 percent by weight and more preferably 0.001 to 10 percent by weight.

If necessary, an electrochromic substance of formula (1) may be doped with a compound facilitating coloration. Alternatively, an electrochromic substance and an electron donating compound may coexist in an ion conductive substance layer.

The ion conductive substance layer of the electrochromic device according to the present invention is formed from an ion conductive substance containing an electrochromic substance of formula (1) dispersed therein.

Any suitable method can be employed for forming the ion conductive substance layer. When a liquid or gelatinized liquid ion conductive substance is used, the ion conductive substance containing an electrochromic substance dispersed therein is injected into the space provided between two electrically conductive substrates, i.e. counter conductive substrates, placed, facing each other and then sealed at the edges of the opposed surfaces, by vacuum injection, atmospheric injection or a meniscus method. Alternatively, when using a specific type of ion conductive substance, a method can be employed in which an ion conductive substance layer containing an electrochromic substance is formed on one of the electrically conductive substrates by sputtering, evaporation or a sol-gel method and the substrate is put together with the other substrate. Further alternatively, an electrochromic device according to the present invention can be obtained by inserting a film-like ion conductive substance containing an electrochromic substance between a pair of glasses to form a laminated glass.

When a solid ion conductive substance, particularly the above-described Composition A or B is used, a method can be employed in which the composition in an unsolidified state is inserted into the space between the counter conductive substrates with their peripheral edges being sealed, by vacuum injection, atmospheric injection or a meniscus method and is cured in a suitable manner.

DETAILED DESCRIPTION OF THE INVENTION

Figure 1:
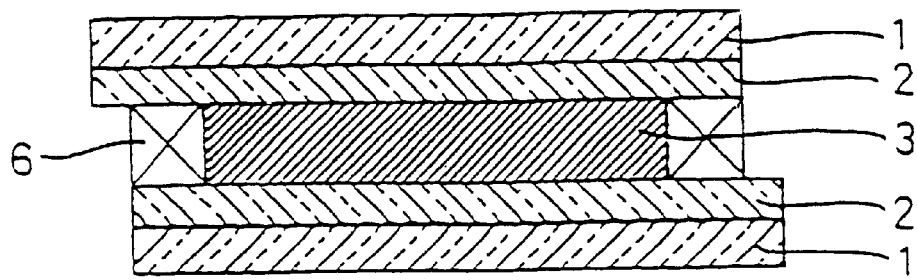
FIG. 1 is a cross-sectional view of an electrochromic device according to the invention.

The structure of an electrochromic device according to the present invention is now described taken in connection with FIG. 1.

The electrochromic mirror shown in FIG. 1 is composed of two transparent electrically conductive substrates each consisting of a transparent substrate (1) and a transparent electrode layer (2) formed thereon and placed in opposed relation such that the transparent electrode layers face toward each other and an electrochromic substance-containing ion conductive substance layer (3) disposed between the transparent electrode layers.

The electrochromic device in FIG. 1 is produced by the following procedures. Two transparent conductive substrates are produced by forming a transparent electrode layer (2) on one surface of each of two transparent substrates (1). The two transparent electrically conductive substrates thus produced are placed in opposed relation such that the transparent electrode layer (2) face each other, spaced 1–1, 000 μm apart and sealed at their edges with a sealant (6), leaving a portion used for an inlet, thereby forming a empty cell. Subsequently, an ion conductive material having a viologen-structure compound dispersed therein is injected through the inlet into the cell, followed by sealing the inlet thereby producing an electrochromic device.

When the ion conductive substance layer (3) is formed using Composition A or B containing an electrochromic substance dispersed therein, the composition is usually cured after being injected into the space between conductive substrates. Although not restricted, Composition A or B is cured with light or heat or by being injected into the cell immediately after mixed with a reactive liquid which is cures with the progress of time. The inlet of the cell may be sealed in a suitable manner.

When the two substrates are placed, facing each other, a spacer may be inserted therebetween so as to provide a space at a fixed distance apart. No particular limitation is imposed on such a spacer. There may be used a spacer in the form of beads or a sheet. The spacer may be inserted between the conductive substrates facing each other or provided by forming the protrusions of an insulate material on the electrode of an electric conductive substrate.

Although FIG. 1 shows a typical example of the structure of the inventive electrochromic device, it may be provided with an ultraviolet blocking layer such as an ultraviolet reflective layer and an ultraviolet absorbing layer, an overcoat layer arranged to protect the element entirely or the surface of each of the films or layers and a reflective plate to be used as a antiglare mirror. The ultraviolet blocking layer is preferably disposed either on the outer side of one of transparent substrates (1) or between a transparent electrode layer (2) and the ion conductive substance layer (3), while the overcoat layer is preferably disposed on the outer side of one of transparent substrates (1). The reflective plate is generally disposed on the outer side of one of transparent substrates (1). If a reflective plate has electrical conductivity, it can be replaced for the transparent electrode layer (2).

Figure 2:
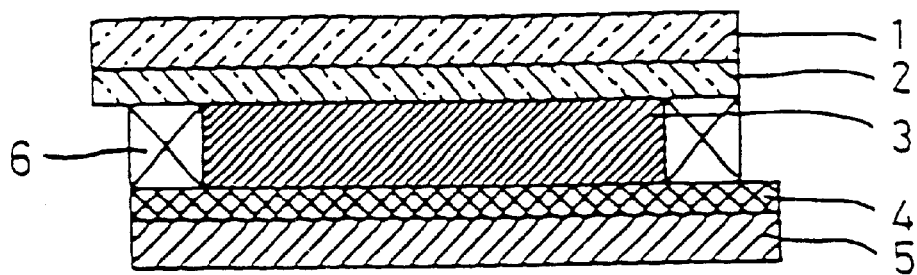
FIG. 2 is a cross-sectional view of an electrochromic mirror according

An electrochromic mirror as shown in FIG. 2 has a structure constituted by replacing one of the two transparent conductive substrates with the transparent electrodes (2) of the electrochromic device shown in FIG. 1 with a conductive substrate composed of a substrate (5) and a reflective palladium electrode layer (4).

Because the electrochromic device according to the present invention has a specified electrochromic compound contained in the ion conductive substance, it is quick in response and can easily be adjusted in coloration density with sufficient durability. Furthermore, the inventive electrochromic device can be easily manufactured at a relatively low cost. It is also possible to produce a large-sized electrochromic device with an enhanced safety because of capability of using a solid electrolyte as an ion conductive material layer which is free from scattering.

For the reasons described above, the electrochromic device according to the present invention is suitably applicable to light controlling windows for buildings and for vehicles such as automobiles, light controlling device for decoration and partitions and antiglare mirrors for automobiles.

The present invention is now described in further detail with reference to Examples, which are given only by way of illustration and are not intended for limiting the invention.

EXAMPLE 1

(1) Synthesis of an Electrochromic Substance (Viologen Compound)

In a flask, 3.12 g (20 mmol) of bipyridyl was dissolved in 1000 ml acetonitrile, and 7.16 g (40 mmol) of n-heptylbromide was added thereto.

The mixture was reacted at the reflux temperature of acetonitrile for 12 hours and the precipitated solid product was filtrated and dried thereby obtaining 8.74 g (17 mmol) of N,N'-diheptylbipyridiniumdibromide.

(2) Preparation of an Electrochromic Device

An epoxy-based resin was applied in the form of lines on the edges, except a portion thereof, of the surface of an ITO transparent electrode coated over a substrate. Onto this substrate, an ITO-coated transparent substrate is placed such that both of the ITO surfaces face each other while being pressed so as to cure the adhesive, thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane-1-on manufactured by Merk Co,. Ltd., under the name of "Darocure-1116" as a photo-polymerization initiator in a dark room thereby obtaining a homogeneous solution. To the resulting homogeneous solution were added 1.00 g (1.84 mmol) of N,N'-diheptylbipyridiniumdibromide obtained in (1) above and 0.442 g (1.84 mmol) of N,N,N',N'-tetramethylbenzidine manufactured by Tokyo Kasei Co., Ltd. and the mixture was uniformalized and then injected as an electrolyte precursor into the cell obtained above through the inlet after being deaerated.

After the inlet port was sealed with an epoxy sealant, the electrolyte precursor in the cell was cured by exposing the side of the transparent substrate to fluorescent light so as to form a solid electrolyte thereby obtaining an all solid type electrochromic device of the structure.

The element when assembled was not colored and had a transmittance of about 90%. The element was quick in response to an application of an electric voltage and exhibited excellent electrochromic properties. Namely, the mirror was colored green upon an application of a voltage of 1.5 V and was about 20% in a transmittance of 633 nm wavelength of light.

EXAMPLE 2

(1) Synthesis of an Electrochromic Substance (a Viologen Compound)

In a flask, 3.12 g (20 mmol) of bipyridyl was dissolved in 1000 ml methanol, and 7.16 g (40 mmol) of n-heptylbromide was added thereto.

The mixture was reacted at the reflux temperature of methanol for 12 hours and the precipitated solid product was filtrated and dried thereby obtaining 8.00 g (16 mmol) of N,N'-dibenzylbipyridiniumdibromide.

(2) Preparation of an Electrochromic Mirror

An epoxy-based resin was applied in the form of lines on the edges, except a portion thereof, of the surface of a palladium film layer formed as a highly reflective electrode over a substrate. Onto this substrate, an $SnO_2^-$ coated transparent glass substrate is placed such that the $SnO_2$ surface face the palladium surface while being pressed so as to cure the adhesive, thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane-1-on manufactured by Merk Co,. Ltd., under the name of "Darocure-1116" as a photopolymerization initiator and 2 grams of N,N'-dibenzylbipyridiniumdibromide obtained in (1) above in a dark room thereby obtaining a homogeneous solution again. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of the transparent substrate to fluorescent light so as to form a electrochromic polymeric solid electrolyte thereby obtaining an all solid type electrochromic mirror of the structure as shown in FIG. 2.

The element when assembled was not colored and had a reflectance of about 85%. The mirror was quick in response to an application of an electric voltage and exhibited excellent electrochromic properties. The mirror was colored green upon an application of a voltage of 1.5 V and had a reflectance of about 15%.

We claim:

1. An electrochromic device comprising two electrically conductive substrates, at least one of which is transparent, and an ion conductive substance layer disposed therebetween and comprising a mixture obtained by dispersing an electrochromic substance represented by formula (1) below into a composition containing a monofunctional acryloyl-modified polyalkylene oxide represented by formula (17) and a polyfunctional acryloyl-modified polyalkylene oxide represented by formula (18) or (19), a polar solvent and a supporting electrolyte; formula (1) being represented by

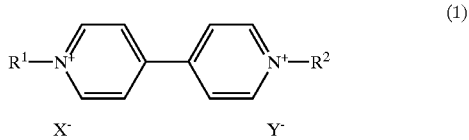

wherein $X^-$ and $Y^-$ are the same or different and are each a counter anion selected from the group consisting of a halogen anion, $ClO_4^-$, $BF_4^-$, $PF_4^-$, $CH_3COO^-$ and $CH_3(C_6H_4)SO_3^-$ and $R^1$ and $R^2$ are the same or different and are each a hydrocarbon group having from 1 to 20 carbon atoms; formula (17) being represented by

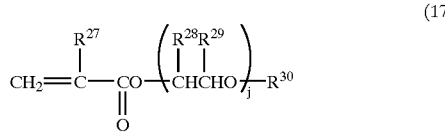

wherein $R^{27}$, $R^{28}$, and $R^{29}$ are each selected from the group consisting of hydrogen and an alkyl group having 1 to 5 carbon atoms, $R^{30}$ is an alkyl group having 1 to 5 carbon atoms, and j is an integer of 2 to 30;

formula (18) being represented by

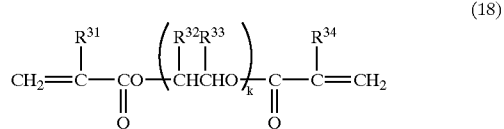

wherein $R^{31}$, $R^{32}$, $R^{33}$, and $R^{34}$ are each selected from the group consisting of hydrogen and an alkyl group having 1 to 5 carbon atoms, and k is an integer of 2 to 30; and formula (19) being represented by

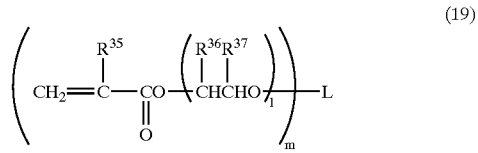

wherein $R^{35}$, $R^{36}$, and $R^{37}$ are each selected from the group consisting of hydrogen and an alkyl group having 1 to 5 carbon atoms, l is an integer of 2 to 30, m is an integer of 2 to 4 and L is a connecting group having a valence corresponding to m.

2. The electrochromic device according to claim 1 wherein the electrochromic substance of formula (1) is selected from the group consisting of N,N'-diheptylbipyridiniumdibromide,
N,N'-diheptylbipyridiniumdichloride,
N,N'-diheptylbipyridiniumdiperchlorate,
N,N'-diheptylbipyridiniumtetrafluoroborate,
N,N'-diheptylbipyridiniumhexafluorophosphate,
N,N -dihexylbipyridiniumdibromide, N,N'-dihexylbipyridiniumdichloride,
N,N'-dihexylbipyridiniumdiperchlorate,
N,N'-dihexylbipyridiniumtetrafluoroborate,
N,N'-dihexylbipyridiniumdihexafluorophosphate,
N,N'-dipropylbipyridiniumdibromide, N,N'-dipropylbipyridiniumdichloride,
N,N'-dipropylbipyridiniumdiperchlorate,
N,N'-dipropylbipyridiniumtetrafluoroborate,
N,N'-dipropylbipyridiniumdihexafluorophosphate,
N,N'-dibenzylbipyridiniumdibromide,
N,N'-dibenzylbipyridiniumperchlorate,
N,N'-dibenzylbipyridiniumtetrafluoroborate,
N,N'-dibenzylbipyridiniumdihexafluorophosphate,
N-heptyl-N'-benzylbipyridiniumdiperchlorate,
N-heptyl-N'-benzylbipyridiniumditetrafluoroborate,
N-heptyl-N'-benzylbipyridiniumdibromide,
N-heptyl-N'-benzylbipyridiniumdichloride,
N-heptyl-N'-methylpyridiniumdibromide and
N-heptyl-N'-methylpyridiniumdlchloride.

3. By The electrochromic device according to claim 1 wherein the polar solvent is an organic polar solvent selected from the group consisting of methanol, ethanol, propylene carbonate, ethylene carbonate, dimethylsulfoxide, dimethoxyethane, acetonitrile, γ-butyrolactone, γ-valerolactone, sulforan, dimethylformamide, dimethoxyethane, tetrahydrofuran, propionitrile, glutaronitrile, adiponitrile. methoxyacetonitrile, dimethylacetoamide, methylpyrrolidinone, dimethylsulfoxide, dioxolane, trimethylphosphate, and polyethylene glycol.

4. The electrochromic device according to claim 1 wherein the supporting electrolyte is selected from the group consisting of alkali metal salts, alkaline earth metal salts, quaternary ammonium salts and cyclic quaternary ammonium salts.

5. The electrochromic device according to claim 1 wherein an amount of the polar solvent contained in the layer is in a range of 100 to 800 weight % based on a total amount of the monofunctional acryloyl-modified polyalkylene oxide and the polyfunctional acryloyl-modified polyalkylene oxide.

6. An electrochromic device comprising two conductive substrates, at least one of which is transparent, and an ion conductive substance layer disposed therebetween and containing an electrochromic substance represented by the formula (1)

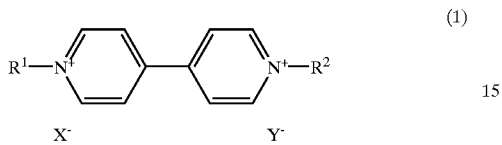
(1)

wherein $X^-$ and $Y^-$ are the same or different and are each a counter anion selected from the group consisting of a halogen anion, $ClO_4^-$, $BF_4^-$, $PF_4^-$, $CH_3COO^-$ and $CH_3(C_8H_4)SO_3^-$ and $R^1$ and $R^2$ are the same or different and are each a hydrocarbon group having from 1 to 20 carbon atoms and wherein the ion conductive substance comprises a mixture obtained by dispersing the electrochromic substance into a composition containing an urethaneacrylate represented by formula (2) below, a polar solvent and a supporting electrolyte; formula (2) being represented by the formula

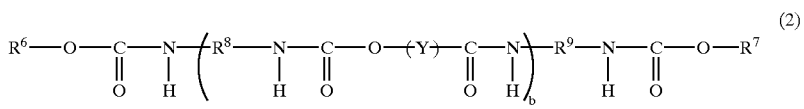
(2)

wherein $R^6$ and $R^7$ are the same or different and are each a group of formula (3), (4) or (5) below, $R^8$ and $R^9$ are the same or different and are each a $C_1$–$C_{20}$, preferably $C_2$–$C_{12}$ divalent hydrocarbon residue, Y is selected from a polyether unit, a polyester unit, a polycarbonate unit and mixed units thereof and b is an integer from 1 to 100, preferably 1 to 50 and more preferably 1 to 20;

formulae (3), (4) and (5) being represented by the formulae

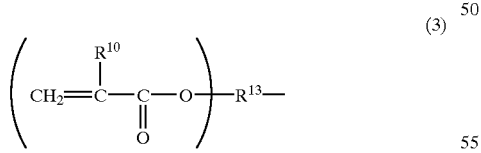
(3)

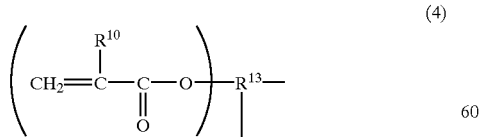
(4)

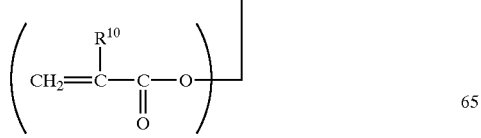

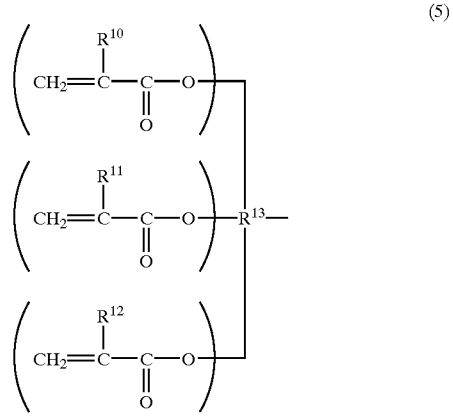
(5)

wherein $R^{10}$, $R^{11}$ and $R^{12}$ are the same or different and are each a hydrogen atom or a $C_1$–$C_3$ alkyl group and $R^{13}$ is a $C_1$–$C_{20}$, preferably $C_2$–$C_8$ organic residue of divalent through quatervalent.

* * * * *